 United States Patent
Cherubini et al.

(10) Patent No.: US 7,797,178 B2
(45) Date of Patent: Sep. 14, 2010

(54) SYSTEMS AND METHODS FOR DETERMINING OPTIMAL UTILIZATION LEVELS IN A FIXED CAPACITY SYSTEM

(75) Inventors: James C. Cherubini, Ramsey, NJ (US); Edmund G. Dabagian, Morganville, NJ (US); Jung-bae Kim, Edison, NJ (US)

(73) Assignee: Morgan Stanley, New York, NY (US)

( * ) Notice: Subject to any disclaimer, the term of this patent is extended or adjusted under 35 U.S.C. 154(b) by 1363 days.

(21) Appl. No.: 11/133,569

(22) Filed: May 20, 2005

(65) Prior Publication Data

US 2006/0265297 A1 Nov. 23, 2006

(51) Int. Cl.
*G06Q 40/00* (2006.01)
(52) U.S. Cl. .......................................... 705/7
(58) Field of Classification Search ............... 705/35, 705/7–10
See application file for complete search history.

(56) References Cited

U.S. PATENT DOCUMENTS

| | | | | |
|---|---|---|---|---|
| 5,748,478 | A * | 5/1998 | Pan et al. .................. | 700/99 |
| 2002/0152305 | A1 * | 10/2002 | Jackson et al. ............ | 709/224 |
| 2005/0132051 | A1 * | 6/2005 | Hill et al. .................. | 709/226 |
| 2005/0135313 | A1 * | 6/2005 | Gandhi et al. ............. | 370/335 |
| 2006/0195327 | A1 * | 8/2006 | Kumar et al. .............. | 705/1 |

OTHER PUBLICATIONS

Leachman, Robert."Closed-Loop Measurement of Equipment Efficiency and Equipment Capacity." IEEE Transactions On Semiconductor Manufacturing, vol. 10, No. 1, Feb. 1997.*
Canada, John R., Sullivan, William G., Kulonda, Dennis J., and White, John A. Capital Investment Analysis for Engineering and Management. New Jersey: Pearson Prentice Hall, 2004.*
Gaboury, Peter, Killeen, Della and Paccard, Denis. "Managing, Measuring and Improving Equipment Capacity and Overall Equipment Efficiency (O.E.E.) using iPLUS." Semiconductor Manufactruring Sumposium, Oct. 2001, pp. 25-28.*
"Planning Your Next Breakdown?" Process Engineering, vol. 80 No. 10 Oct. 1999, p. 27.*

* cited by examiner

*Primary Examiner*—Beth V Boswell
*Assistant Examiner*—Renae Feacher
(74) *Attorney, Agent, or Firm*—K&L Gates LLP

(57) ABSTRACT

A method. The method includes includes determining a hardware efficiency factor for an asset having a fixed capacity and a predictable capacity consumption rate, and determining a touch efficiency factor for the asset. The touch efficiency factor represents a measurement of the frequency of touch of the asset, and touch represents a disruption of the asset occurring when the asset reaches the fixed capacity. The method further includes determining an optimal utilization level based on both the hardware efficiency factor and the touch efficiency factor.

19 Claims, 6 Drawing Sheets

SYSTEMS AND METHODS FOR DETERMINING OPTIMAL UTILIZATION LEVELS IN A FIXED CAPACITY SYSTEM

BACKGROUND

This application discloses an invention related, generally and in various embodiments, to systems and methods for determining optimal utilization levels for fixed capacity assets. For a utility provider, decisions regarding utilization of fixed capacity assets are undertaken based on factors such as cost (e.g., asset cost and labor cost) and delivery times. Traditionally, cost has been treated as the deciding factor on whether the operating model of a utility is financially sound because the profitability of an asset is a quantifiable measurement of performance. Timing aspects, however, are important because having sufficient capacity is critical for a utility provider.

Often, a utility provider will monitor the operating efficiency of assets to determine whether purchased assets are justifying their costs and/or whether additional assets should be purchased. For example, a utility provider may establish target utilization for a particular class of asset. From the standpoint of the utility provider, the target is intended to avoid underutilization of existing assets while providing a safeguard with respect to remaining capacity.

In order to achieve target utilization, the utility provider may implement certain policies and requirements. For example, the utility provider may require allocation and/or reallocation of users to assets perceived to be underutilized and from assets approaching the target utilization.

Superficially, a utilization target may appear to seek a reasonable balance between asset cost and the risk of insufficient capacity. However, a method of determining a utilization level based only on factors such as cost and delivery times neglects important factors prevalent in a fixed capacity system.

SUMMARY

In one general respect, this application discloses a method for determining optimal utilization levels for a fixed capacity system. According to various embodiments, the method includes determining a hardware efficiency factor for an asset having a fixed capacity and a predictable capacity consumption rate, and determining a touch efficiency factor for the asset. The touch efficiency factor represents a measurement of the frequency of touch of the asset, and touch represents a disruption of the asset occurring when the asset reaches the fixed capacity. The method further includes determining an optimal utilization level based on both the hardware efficiency factor and the touch efficiency factor.

Aspects of the present invention may be implemented by a computer system and/or by a computer program stored on a computer-readable medium. The computer-readable medium may comprise a disk, a device, and/or a propagated signal.

Other features and advantages will be apparent from the following description, including the drawings, and from the claims.

DETAILED DESCRIPTION

The figures and descriptions of the disclosed invention have been simplified to illustrate elements that are relevant for a clear understanding of the invention. It should be understood that the apparatus, systems, and methods described below may include various other components, structures, and/or processes in actual implementation.

Figure 1:
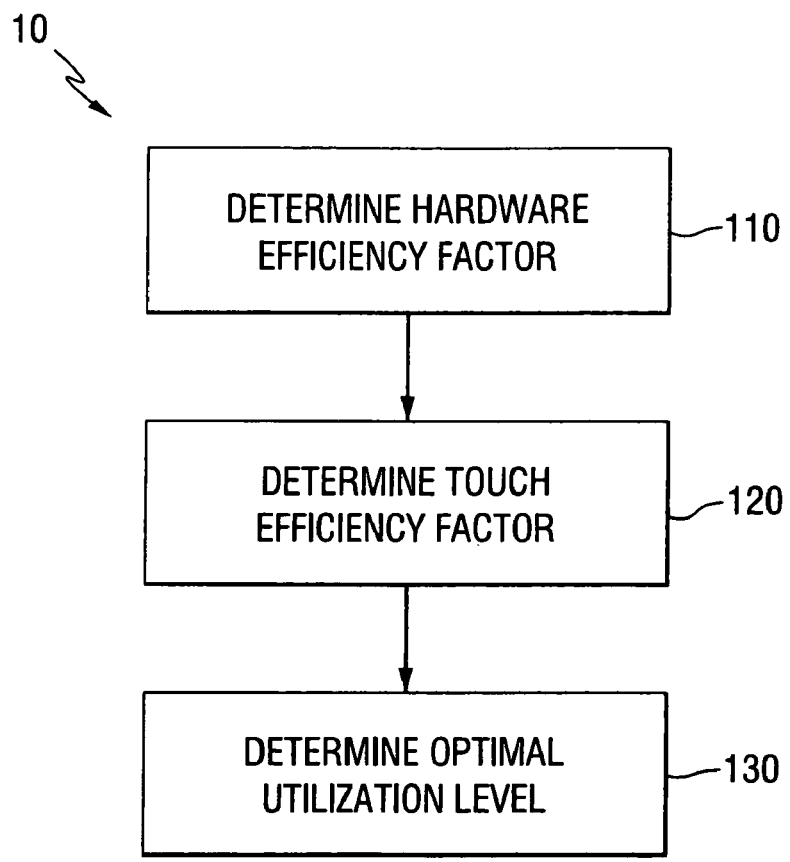
FIG. 1 illustrates various embodiments of a method for determining optimal utilization levels in a fixed capacity system.

FIG. 1 illustrates various embodiments of a method 10 for determining optimal utilization levels of a fixed capacity system. The method 10 may be implemented by hardware (e.g., device, computer, computer system, equipment, component); software (e.g., program, application, instruction set, code); storage medium (e.g., disk, device, propagated signal); or combination thereof. It should be noted, however, that the method 10 may be performed in any manner consistent with aspects of the disclosed invention.

At step 110, a hardware efficiency factor is determined for an asset having a fixed capacity and a predictable capacity consumption rate. As used herein, the term "fixed capacity" refers to a maximum capacity with respect to a certain resource. The capacity consumption rate is sometimes referred to herein as a "growth rate". Moreover, the amount of asset capacity consumed over a specified time interval is sometimes referred to herein as the "growth". In general, the hardware efficiency factor is designed to quantify how often a given asset reaches its full capacity at a predictable growth rate. The hardware efficiency factor is based on the premise that an asset operated at a low utilization level will reach full capacity over a longer period of time. And, while there is little risk of exhausting the resources of an underutilized asset, such unused capacity represents an investment in the asset that is not returning value. Because an asset having a high fixed capacity is typically expensive, there often is a mandate to operate the asset as efficiently as feasible.

In general, the hardware efficiency factor can be calculated for any asset having fixed capacity. Examples of fixed capacity assets include, but are not limited to: a storage utility (e.g., storage array, memory device, server), a computer processor (e.g. CPU), a utility asset (e.g., electricity plant, an electrical outlet, transmission line, gas pipeline, water main, reservoir, filtration plant, sewage treatment plant), physical space (e.g., office space), and scheduled transportation (e.g., e.g., trains, buses, aircraft, boats). In a business, for example, storage arrays may be procured at the company level and then allocated to various groups within the company. Users within a group typically share a particular allotment of storage space. In some cases, the storage arrays may be allocated on a first come first serve basis irrespective of geographic location.

In various embodiments, the hardware efficiency factor $E_H$ of an asset having a fixed capacity can be determined by the following equation:

$$E_H = (1+G)\frac{r}{(1+Gr)}$$

where r is the utilization of the asset and G is a constant equal to the growth rate of the asset minus the rate of price decrease of the asset. The utilization (r) may be expressed, for example, over a range of percentages from 0% to 100%. The growth rate may also be expressed as a percentage, and may be determined based on observed historical growth, industry standard growth, or any other reasonable data. Similarly, the rate of price decrease may be expressed as a percentage, and may be determined based on observed historical price decreases, industry standard price decreases, or any other reasonable data.

A mathematical proof of the hardware efficiency factor is set forth below. The proof demonstrates mathematically the assumption that as you increase the utilization levels of an asset, given certain constraints, there are diminishing returns on the asset. The various factors used with the proof of the hardware efficiency factor are as follows:

S=total capacity;
C=unit size;
r=utilization;
g=growth rate; and
d=price decrease.

The various constants used with the proof of the hardware efficiency factor are as follows:

G=growth and price constant; and
K=total and unit size constant.

The following initial equation may be used to equate the hardware efficiency factor $E_H$ to given factors within a fixed capacity system.

$$E_{H_0} = \frac{1}{\left(\frac{S}{C} * \frac{1}{r}\right) + \left(\frac{S}{C} * G\right)}$$

where G=g−d and r: $0 < r \leq 1$

By converting known values to a constant, the equation can be rewritten as follows:

$$E_{H_0} = \frac{1}{K * \frac{1}{r} + GK}$$

where $$K = \frac{S}{C}$$

By following algebraic rules, the equation can be rewritten as follows:

$$E_{H_0} = \frac{r}{K + KGr} = \left(\frac{1}{K}\right)\frac{r}{1+Gr}$$

Figure 2:
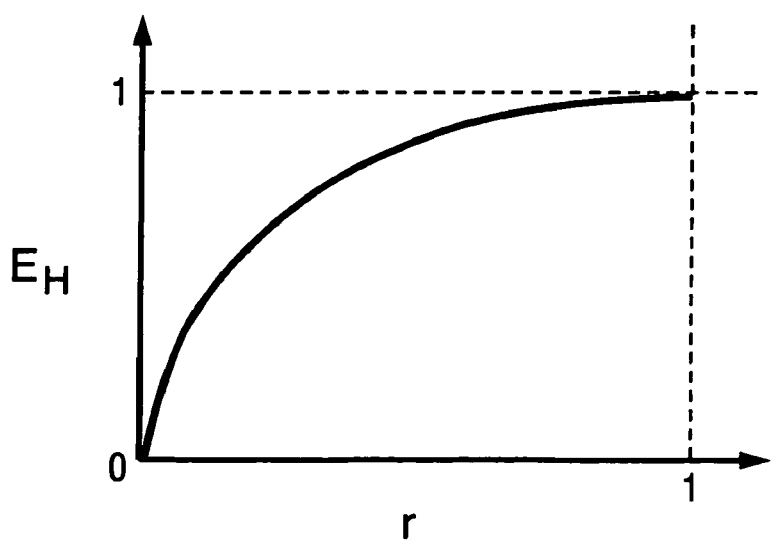
FIG. 2 illustrates a plot of a mathematical function.

In order for the equation to be compatible with the touch efficiency factor described at step 120, the value for the hardware efficiency factor is normalized to allow for analysis of the hardware efficiency factor and the touch efficiency factor under the same scale. As shown in FIG. 2, both the domain and the range of the function $E_H(r)$ should be within 0 and 1. Therefore, domain and range may be defined as follows:

Domain=r: $0 < r \leq 1$ and Range=$E_H$: $0 < E_H < 1$

For $E_H$ to be confined in the range of 0 to 1, a constant "A" is identified such that when $E_H$ is multiplied by the constant, $E_H$ has a maximum value of 1 when r=1. The result of multiplying $E_H$ by the constant A can represented by the following equation:

$$E_H = \frac{A}{K * \frac{1}{r} + GK} = 1$$

When r=1, the equation can be rewritten as follows:

$$E_H(1) = \frac{A}{K + GK} = 1$$

By following algebraic rules, the equation can be rewritten as follows:

$$A = K + GK$$

Therefore, when $0 < E_H < 1$ and $0 < r \leq 1$, substitution and algebraic rules can be applied to the equation to rewrite the equation for the hardware efficiency factor $E_H$ as follows:

$$E_H = \frac{K+GK}{K\frac{1}{r}+GK} = \frac{K+GK}{K} * \frac{r}{1+Gr} = (1+G)\frac{r}{1+Gr}$$

At step 120, a touch efficiency factor is determined for the asset having the fixed capacity and predictable capacity consumption rate. The touch efficiency factor is a measure of the frequency of "touch" of the asset, where a "touch" is a disruption to the asset needed to provide more capacity. In general, the concept of "touching" a system or asset refers to the frequency, over a given period of time, that an asset or system reaches its maximum capacity and requires modification in order to provide more capacity. Touching an asset usually involves an interruption of service causing disruption to the user. Moreover, incorrectly executed touches can be one of the leading causes of instability and outage in a system.

For example, when a storage array having a fixed capacity reaches (or approaches) its maximum capacity or threshold utilization, data must be moved to another storage array. Typically, the host server must be taken down so the new storage can be presented. Data is copied to the new storage array, and the host server must be taken down again to remove visibility to the old storage array. In cases where a storage array is significantly underutilized, the host server must be taken down, the excess space is removed, and the host server is rebooted so that the space is no longer visible.

There also is significant work involved in planning and scheduling the touch. For instance, care must be taken to avoid having a multitude of host servers down during production hours. In addition, touches typically are scheduled for multiple storage arrays on multiple host servers. As such, planning may involve pre-scheduling maintenance windows with users including those users that are dependant on downstream systems affected by the work. Furthermore, users may be required to confirm the operability of the storage arrays following the touch.

In general, the touch efficiency factor is designed to quantify the effort and resources expended to touch an asset. The touch efficiency factor is based on the premise that disruption to the environment reduces the efficiency of an asset. Namely, the time and effort involved with scheduling the touch, down time, performing the work, and/or reviewing the application all negatively impact the overall efficiency of an asset.

Moreover, assets operated at a high utilization level, while more efficiently using capacity, require more time and effort to migrate overflow capacity to new assets. As the size of the environment increases, more assets require touching at high utilization levels. The significant contribution of time and effort to schedule and perform required touches might outweigh the benefit of increased utilization. Furthermore, the concept of touch efficiency embodies more than labor costs. Namely, the more frequently touching is required, the more often errors occur.

In various embodiments, the touch efficiency factor $E_T$ of an asset having a fixed capacity can be determined by the following equation:

$$E_T = 1 + \frac{L}{\ln r}$$

where r is the utilization of the asset and L is the natural log of the G constant, where the G constant is equal to the growth rate of the asset minus the rate of price decrease of the asset.

A mathematical proof of the touch efficiency factor is set forth below. The proof demonstrates mathematically the assumption that as you increase the utilization levels of an asset, given certain constraints, there are compounding effects on the amount of touch of the asset. The various factors used with the proof of the hardware efficiency factor are as follows:

C=unit size;
r=utilization;
g=growth rate;
d=price decrease; and
P=periods.

The various constants used with the proof of the hardware efficiency factor are as follows:

G=growth and price constant; and
L=natural log of G.

The following initial equation may be used to explain capacity growth:

$$Cr(1+G)^P \leq C$$

From the initial utilization of capacity units, it takes P amount of periods to fill the entire potential capacity C. By following algebraic rules, the equation can be rewritten as follows:

$$r(1+G)^P = 1$$

By following mathematical rules, the equation can be rewritten as follows:

$$(1+G)^P = 1/r$$

By taking the natural log of each side of the equation, the equation can be rewritten as follows:

$$\ln(1+G)^P = \ln\left(\frac{1}{r}\right)$$

By following mathematical rules, the equation can be rewritten as follows:

$$P * \ln(1+G) = \ln\left(\frac{1}{r}\right)$$

The following equation may be used to solve for P(r):

$$P(r) = \frac{\ln\left(\frac{1}{r}\right)}{\ln(1+G)}$$

By setting ln(1+G)=L, the equation can be rewritten as follows:

$$P(r) = \frac{1}{L} * \ln\left(\frac{1}{r}\right)$$

Figure 3:
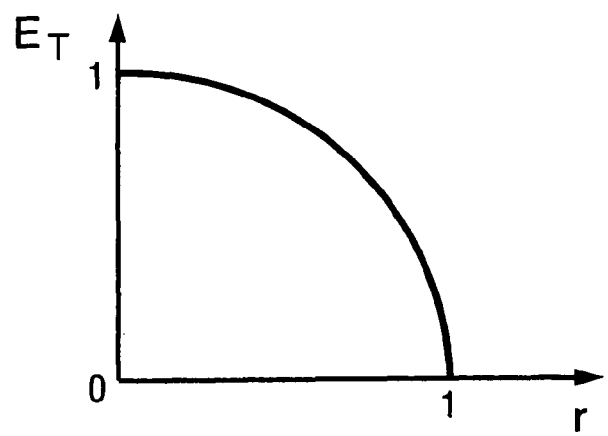
FIG. 3 illustrates a plot of a mathematical function.

In order for the equation to be compatible with the hardware efficiency factor described at step 110, the value for the touch efficiency factor is normalized to allow for analysis of the hardware efficiency factor and the touch efficiency factor under the same scale. As shown in FIG. 3, both the domain and the range of the function $E_T(r)$ should be within 0 and 1. Therefore, domain and range may be defined as follows:

Domain=r: 0<r≦1 Range=$E_T$: 0<$E_T$<1

By following mathematical rules, the equation for P(r) can be rewritten as follows:

$$P(r) = \frac{1}{L}(\ln 1 - \ln r)$$

As the natural log of one is equal to zero, the equation can be rewritten as follows:

$$P(r) = \frac{-\ln r}{L} = -\frac{1}{L}\ln r$$

Figure 4:
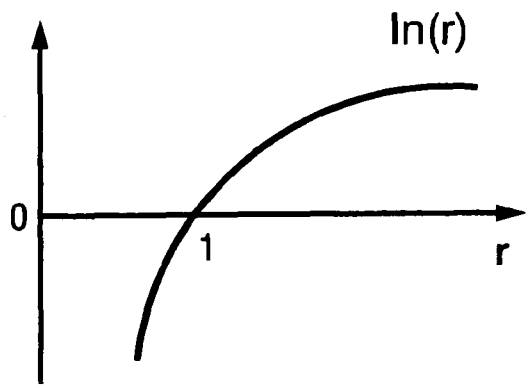
FIG. 4 illustrates a plot of a mathematical function.

As shown in FIG. 4, the values for ln(r) are negative in the domain r: 0<r≦1. For this domain, an increase in the utilization produces a decrease in the touch efficiency factor and a decrease in the utilization produces an increase in the touch efficiency factor.

Figure 5:
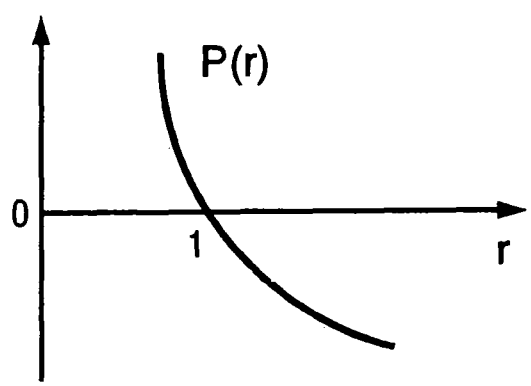
FIG. 5 illustrates a plot of a mathematical function.

A plot of the P(r) function is illustrated in FIG. 5. The plot shows that the smaller the utilization, the more time periods it takes to fill the capacity of a given asset. The plot also shows that the more utilized the asset is, the less time it takes to fill the potential capacity.

Mathematically, the range of P(r) when 0<r<1, is 0<P(r)<+∞. As P(r) is greater than zero, the lowest period will be 1. Therefore, the equation for the P(r) function can be rewritten as follows:

$$P(r) = -\frac{1}{L}\ln(r) = 1$$

By following mathematical rules, the equation can be rewritten as follows:

$$P(r) = -\ln(r) = L$$

The following equation may be used to solve for r:

$$e^{-L} = r$$

By following mathematical rules, the equation can be rewritten as follows:

$$\frac{1}{e^L} = r$$

By following mathematical rules, the equation can be rewritten as follows:

$$r = \frac{1}{e^{\ln(1+G)}} = \frac{1}{1+G} < 1$$

The utilization (r) should be always less than or equal to $$\frac{1}{1+G},$$

which may approach, but not reach, a value of 1.

The following equation may be used to normalize the compounding effects on the amount of touch of an asset:

$$1 - \frac{1}{P(r)} = 1 - \frac{1}{\frac{1}{L}\ln\left(\frac{1}{r}\right)} = 1 - \frac{L}{\ln\left(\frac{1}{r}\right)}$$

Therefore, when r:

$$0 < r < \frac{1}{1+G}$$

the touch efficiency factor can be represented by the following equation:

$$E_T = 1 + \frac{L}{\ln r}$$

At step 130, an optimal utilization level is determined for the asset having the fixed capacity and predictable capacity consumption rate. According to various embodiments, the optimal utilization level may be the utilization level where the sum of the hardware efficiency factor $E_H$ and the touch efficiency factor $E_T$ is at its maximum value. According to various embodiments, the sum of the hardware efficiency factor $E_H$ and the touch efficiency factor $E_T$ can be represented following equation:

$$E_S = E_H + E_T$$

Given a specific growth rate, the mathematical proof that the optimal utilization level can occur at the maximum value of the sum of the hardware efficiency factor $E_H$ and the touch efficiency factor $E_T$ is set forth below. By substituting for $E_H$ and $E_T$, the equation for the sum of the hardware efficiency factor $E_H$ and the touch efficiency factor $E_T$ can be rewritten as follows:

$$E_S = \left[(1+G)\frac{r}{1+Gr}\right] + \left[1 + \frac{L}{\ln r}\right]$$

The derivative of the sum function $E_S$ provides insight concerning the behavior of the sum function with respect to its "duration". The derivative can be represented by the following equation:

$$\frac{dE_S}{dr} = (1+G)\left[\frac{(1+Gr) - r(G)}{(1+Gr)^2}\right] + 0 + L\left(\frac{-1}{r(\ln r)^2}\right)$$

By following mathematical rules, the equation can be rewritten as follows:

$$(1+G)\left[\frac{(1+Gr) - Gr}{(1+Gr)^2}\right] - \frac{L}{r(\ln r)^2}$$

By following mathematical rules, the equation can be rewritten as follows:

$$\frac{dE_S}{dr} = \frac{(1+G)}{(1+Gr)^2} - \frac{L}{r(\ln r)^2}$$

By setting the derivative equal to zero, the following equation can be used to determine the minimum and maximum values:

$$\frac{dE_S}{dr} = \frac{(1+G)}{(1+Gr)^2} - \frac{L}{r(\ln r)^2} = 0$$

By following mathematical rules, the equation can be rewritten as follows:

$$\frac{(1+G)}{L} = \frac{(1+Gr)^2}{r(\ln r)^2}$$

By setting $$\frac{(1+G)}{L}$$

equal to "Z", the equation can be written as follows:

$$Z(r(\ln r)^2) = (1+Gr)^2$$

Therefore, the maximum value of the sum function $E_S$ will occur at the intersection points of the following two functions:

$$Z(r(\ln r)^2) \text{ and } (1+Gr)^2$$

From the foregoing, one skilled in the art will appreciate that the hardware efficiency factor $E_H$ and the touch efficiency factor $E_T$ are independent of plant-specific values such as, for example, the total capacity (S) and the unit size (C). With the efficiency range between 0 and 1, the resulting equations for the hardware efficiency factor $E_H$ and the touch efficiency factor $E_T$ only contain variables that directly influence the behavior or the form of the corresponding plots. For example, the resulting equations do not include the magnitude-specific constants such as total capacity (S) and unit size (C). The only variable that affects the value of the sum function with respect to utilization (r) is the growth and price constant (G) which is equal to the growth rate (g) minus the rate of price decrease (d). Accordingly, the equations for the hardware efficiency factor $E_H$, the touch efficiency factor $E_T$ and the sum function $E_S$ can serve as a generic model for resource utilization behavior which can be applied, for example, to a variety of resource utility scenarios. For example, an organization may determine an asset purchasing decision or an asset-related staffing decision based at least in part on the optimal utilization level.

Figure 6:
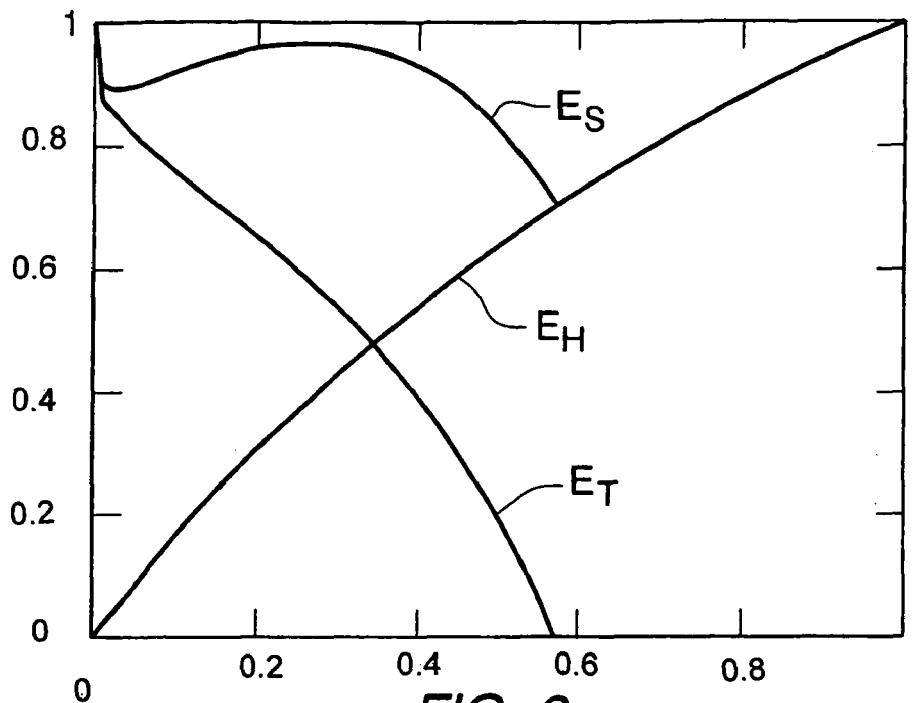
FIG. 6 illustrates various embodiments of a user interface for determining optimal utilization levels in a fixed capacity system.
Figure 7:
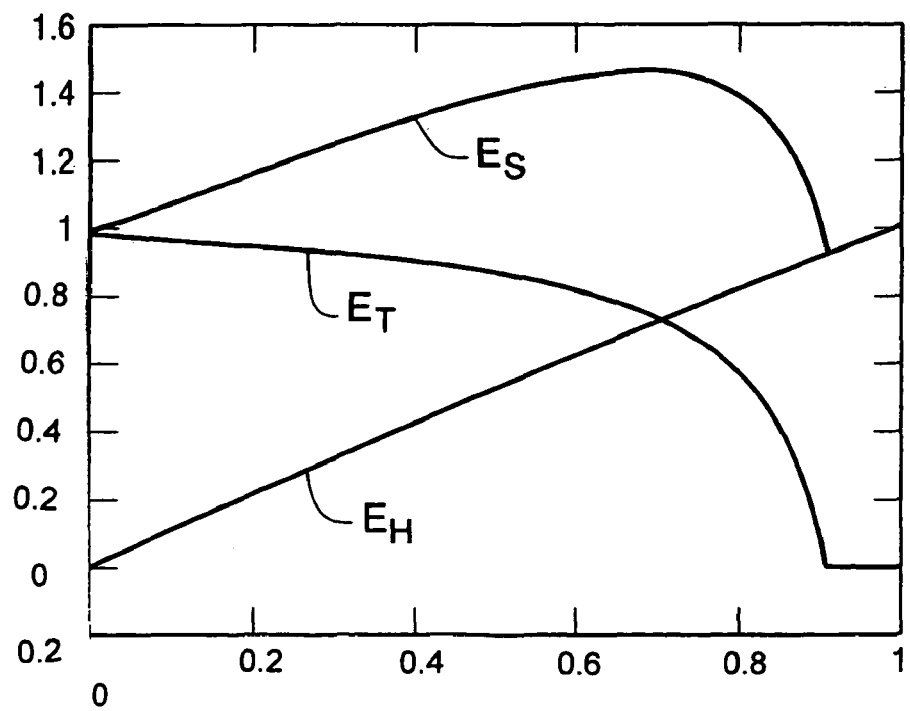
FIG. 7 illustrates various embodiments of a user interface for determining optimal utilization levels in a fixed capacity system.
Figure 8:
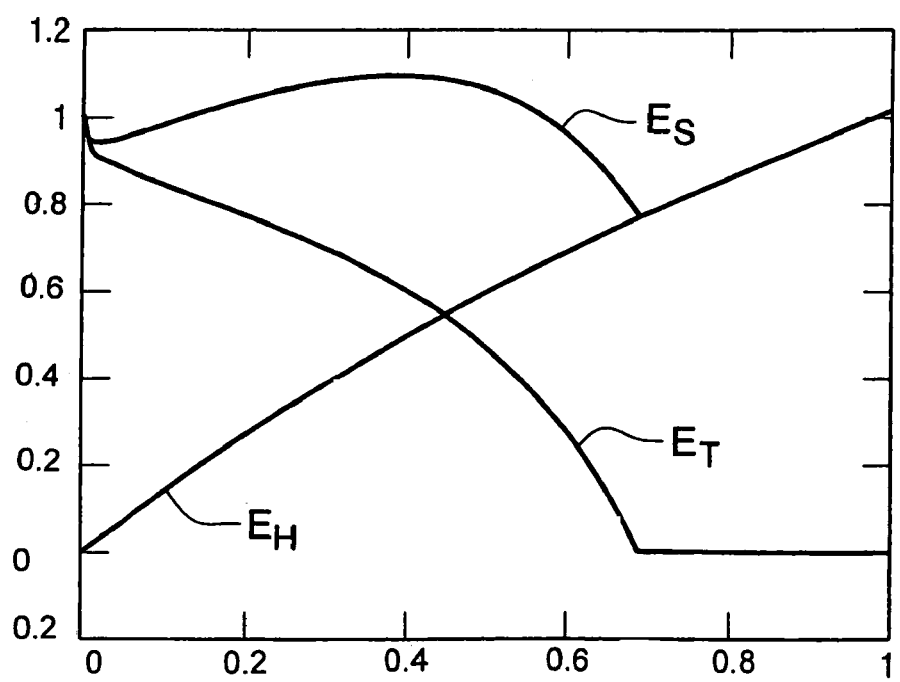
FIG. 8 illustrates various embodiments of a user interface for determining optimal utilization levels in a fixed capacity system.

The hardware efficiency factor $E_H$, the touch efficiency factor $E_T$ and the sum function $E_S$ may be plotted across a range of utilization values. As shown in FIGS. 6-8, various embodiments of a user interface 20 may be used to present the respective plots. The respective plots may be presented via a display and may allow a user such as, for example, a storage service provider, to visually identify the point where the sum function $E_S$ is at its maximum. For example, as shown in FIG. 6, the maximum value of the sum function $E_S$ occurs at a utilization of approximately 27% (r=0.27). For FIG. 7, the maximum value of the sum function $E_S$ occurs at a utilization of approximately 68% (r=0.68). For FIG. 8, the maximum value of the sum function $E_S$ occurs at a utilization of approximately 38% (r=0.38).

According to various embodiments, the optimal utilization level may be a utilization level that is shifted from the point where the value of the sum function $E_S$ is at its maximum. In such implementations, the optimal utilization level is shifted from the point where the value of the sum function $E_S$ is at its maximum based on risk tolerance. For example, a company may determine that the maximum value of the sum function $E_S$ corresponds to a utilization level that does not justify underutilizing the asset. In some cases, a company may be willing to risk more frequent touches to realize more value from the purchased asset. Losing touch efficiency generally may allow a company to gain more hardware efficiency.

Figure 9:
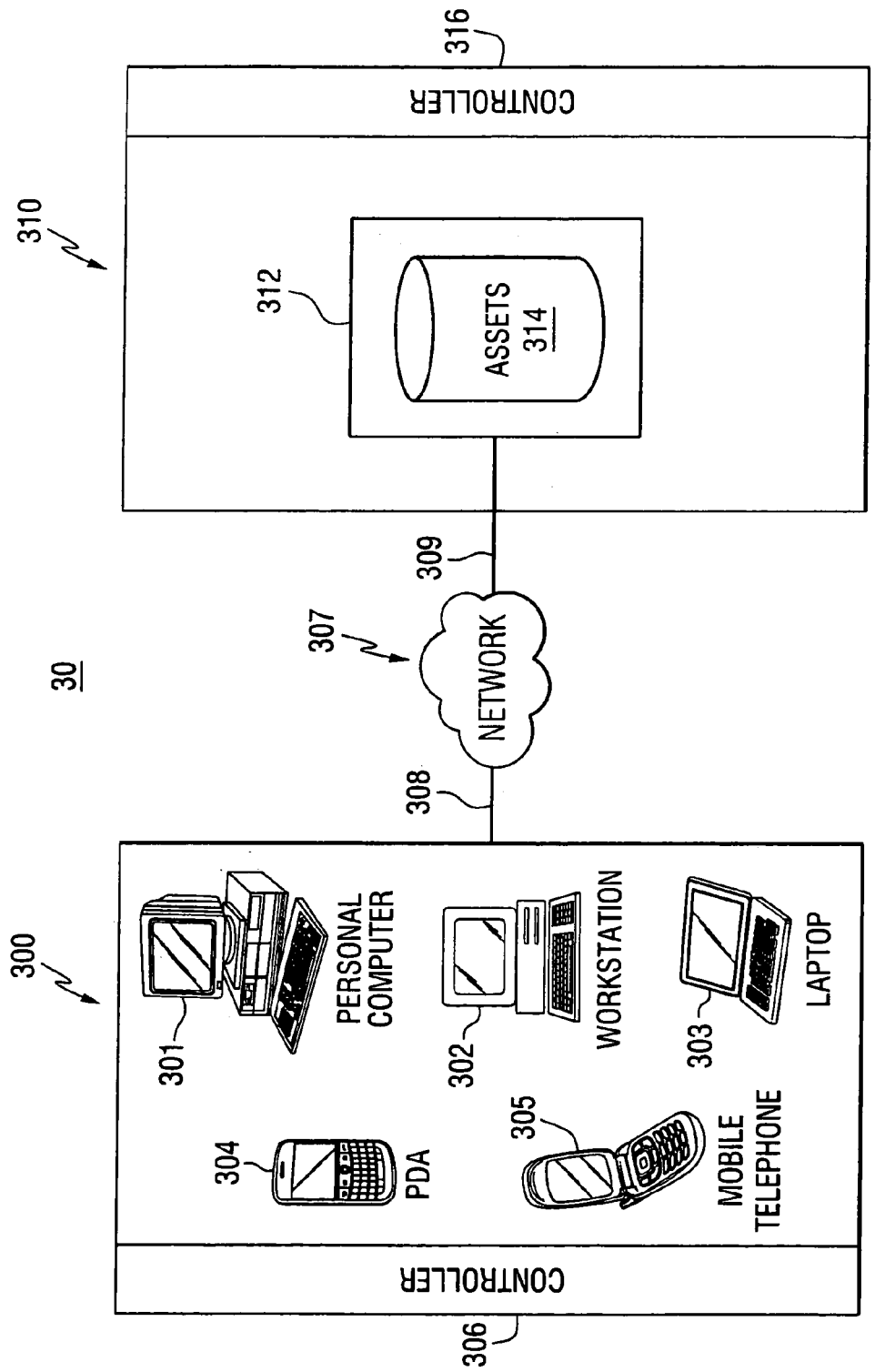
FIG. 9 illustrates various embodiments of a communications system.

FIG. 9 illustrates various embodiments of a communications system 30 in which aspects of the disclosed invention may be implemented. In general, one or more elements of the communications system 30 may perform the method 10 and/or may display the user interface 20 for determining optimal utilization levels of a fixed capacity system, as described above.

As shown, the communications system 30 includes a client system 300 for presenting information to and receiving information from a user. The client system 300 may include one or more client devices such as, for example, a personal computer (PC) 301, a workstation 302, a laptop computer 303, a network-enabled personal digital assistant (PDA) 304, and a network-enabled mobile telephone 305. Other examples of a client device include, but are not limited to a server, a microprocessor, an integrated circuit, or any other component, machine, tool, equipment, or some combination thereof capable of responding to and executing instructions.

In various implementations, the client system 300 operates under the command of a client controller 306. The broken lines are intended to indicate that in some implementations, the client controller 306, or portions thereof considered collectively, may instruct one or more elements of the client system 300 to operate as described. Examples of a client controller 306 include, but are not limited to a computer program, a software application, computer code, set of instructions, plug-in, applet, microprocessor, virtual machine, device, or combination thereof, for independently or collectively instructing one or more client devices to interact and operate as programmed.

The client controller 306 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The client controller 306 (e.g., software application, computer program) may be stored on a computer-readable medium (e.g., disk, device, and/or propagated signal) such that when a computer reads the medium, the functions described herein are performed.

In general, the client system 300 may be connected through a network 307 having wired or wireless data pathways 308, 309 to host system 310. The network 307 may include any type of delivery system including, but not limited to a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 307 may include elements, such as, for example, intermediate nodes, proxy servers, routers, switches, and adapters configured to direct and/or deliver data.

In general, the client system 300 and the host system 310 each include hardware and/or software components for communicating with the network 307 and with each other. The client system 300 and host system 310 may be structured and arranged to communicate through the network 307 using various communication protocols (e.g., HTTP, TCP/IP, UDP, WAP, WiFi, Bluetooth) and/or to operate within or in concert with one or more other communications systems.

The host system 310 generally provides a set of resources for a group of users. As shown, the host system 310 may include one or more servers 312 (e.g., IBM® OS/390 operating system servers, Linux operating system-based servers, Windows NT™ servers) providing one or more assets 314 (e.g., storage arrays, applications) to the group of users.

In various implementations, the host system 110 operates under the command of a host controller 316. The broken lines are intended to indicate that in some implementations, the host controller 316, or portions thereof considered collectively, may instruct one or more elements of host system 310 to operate as described. Examples of a host controller 316 include, but are not limited to a computer program, a software application, computer code, set of instructions, plug-in, microprocessor, virtual machine, device, or combination thereof, for independently or collectively instructing one or more computing devices to interact and operate as programmed.

In general, host controller 316 may utilize any suitable algorithms, computing language (e.g., C, C++, Java, JavaScript, Perl, Visual Basic, VBScript, Delphi), and/or object-oriented techniques and may be embodied permanently or temporarily in any type of computer, computer system, device, machine, component, physical or virtual equipment, storage medium, or propagated signal capable of delivering instructions. The host controller 316 when implemented as software or a computer program, for example, may be stored on a computer-readable medium (e.g., device, disk, or propagated signal) such that when a computer reads the medium, the functions described herein are performed.

Figure 10:
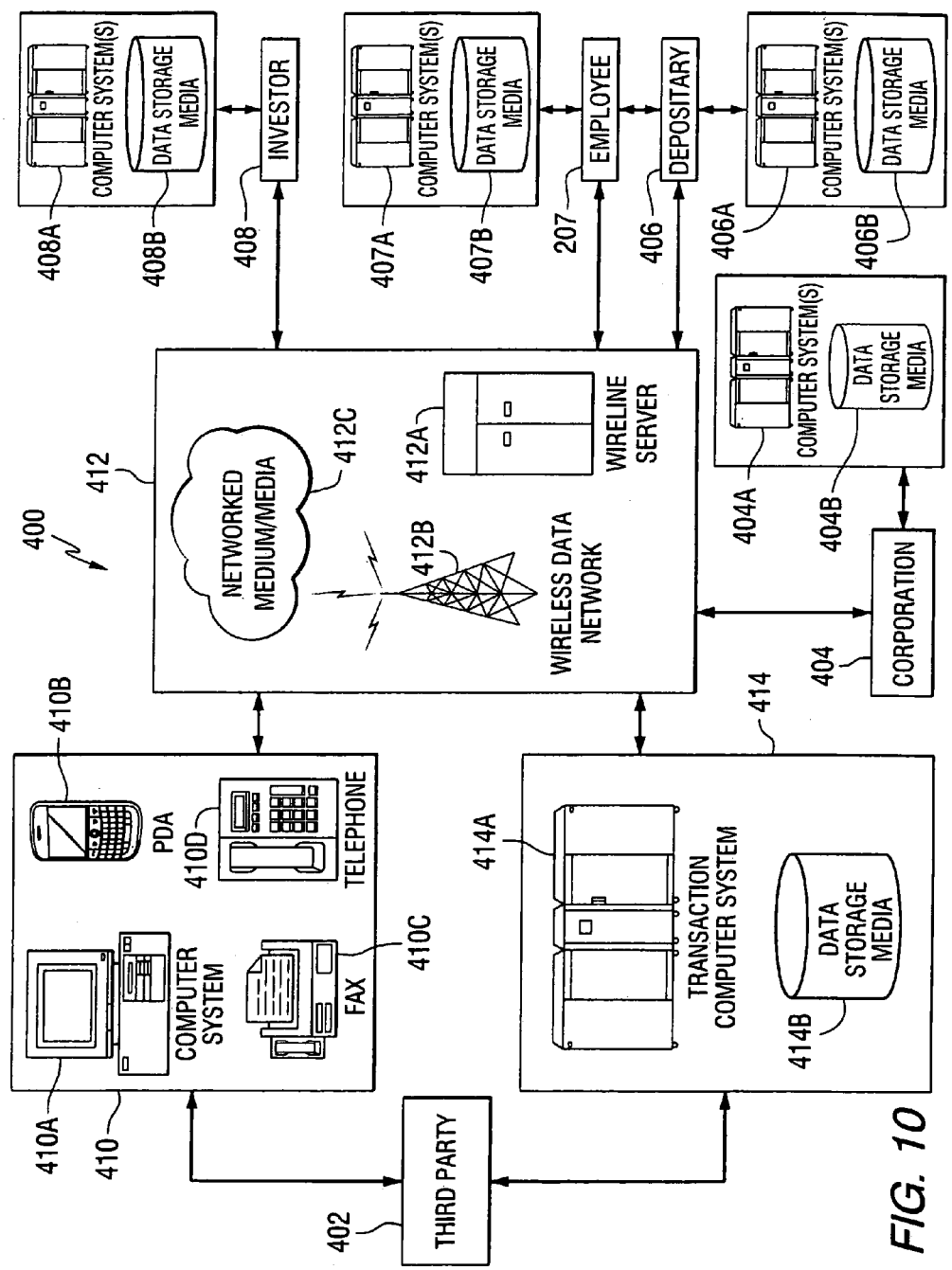
FIG. 10 illustrates various embodiments of a communications system.

FIG. 10 illustrates various embodiments of a communications system 400 in which aspects of the disclosed invention may be implemented. In general, one or more elements of the communications system 400 may perform the method 10 and/or may display the user interface 20 for determining optimal utilization levels of a fixed capacity system, as described above. For example, the system 400 may be utilized to collect usage data for an asset, convert the usage data to a growth rate, collect pricing data, process the collected data, and display information related to the optimal utilization level.

As shown, a third party 402 such as, for example, an underwriter, an investment bank, or an entity can communicate and/or exchange data with one or more of a corporation 404, a depositary 406 (e.g. The Depository Trust Company), an employee 407 and/or an investor 408. In one implementation, the depository 406 may assign a unique identification such as a Committee Uniform Securities Identification Procedures (CUSIP) number, for example, to each security approved for trading. The CUSIP number may be used to track buy and sell orders for the units during issue and/or remarketing.

In various aspects, the third party 402 can be operatively associated with one or more communications devices 410 such as, for example and without limitation, a computer system 410A, a personal digital assistant 410B, a fax machine 410C, and/or a telephone 410D (e.g., a wireline telephone, a wireless telephone, a pager, and the like), and/or other like communication devices. The communication devices 410 may permit the third party 402, the corporation 404, the depositary 406, the employee 407 and/or the investor 408 to communicate between/among each other through one or more communication media 412, such as by use of electronic mail communication through one or more computer systems, for example.

The communication media 412 can include, for example and without limitation, wireline communication means such as a wireline server 412A, a wireless data network 412B, and/or a connection through a networked medium or media 412C (e.g., the Internet). In addition, the third party 402 (as well as any one or more of the corporation 404, the depositary 406, the employee 407 and/or the investor 408) can be operatively associated with one or more data processing/storage devices 414.

As illustrated in FIG. 10, the third party 402 can be operatively associated with a transaction computer system 414A, for example, and/or one or more data storage media 414B that can receive, store, analyze and/or otherwise process data and other information in association with communications that occur between/among the third party 402, the corporation 404, the depositary 406, the employee 407 and/or the investor 408.

In various aspects, the corporation 404 can be operatively associated with one or more computer systems 404A and/or one or more data storage media 404B. In another aspect, the depositary 406 can be operatively associated with one or more computer systems 406A and/or one or more data storage media 406B. In another aspect, the employee 407 can be operatively associated with one or more computer systems 407A and/or one or more data storage media 407B.

In various aspects, the investor 408 can be operatively associated with one or more computer systems 408A and/or one or more data storage media 408B. It can be appreciated that one or more of the computer systems (e.g., 404A, 406A, 407A, 408A, 414A) and one or more of the data storage media (e.g., 404B, 406B, 407B, 408B, 414B) can be employed to communicate, store, analyze, and/or otherwise process data related to financial transactions occurring between and/or among the third party 402, the corporation 404, the depositary 406, the employee 407 and/or the investor 408.

The benefits of the present methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives.

A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method, implemented at least in part by a computing device, the method comprising:

determining, by the computing device, a hardware efficiency factor for an asset having a fixed capacity and a predictable capacity consumption rate, wherein the computing device comprises at least one processor and an operatively associated computer-readable storage medium, and wherein determining the hardware efficiency factor comprises determining the hardware efficiency factor based on the following function:

$$E_H = (1+G)\frac{r}{(1+Gr)}$$

where $E_H$ is the hardware efficiency factor, r is the utilization of the asset and G is a constant equal to the growth rate of the asset minus the rate of price decrease of the asset;

determining, by the computing device, a touch efficiency factor for the asset, the touch efficiency factor representing a measurement of frequency of touch of the asset, where touch represents a disruption of the asset occurring when the asset reaches the fixed capacity, and where the disruption is pursuant to providing additional capacity; and determining, by the computing device, an optimal utilization level based on both the hardware efficiency factor and the touch efficiency factor.

2. The method of claim 1, wherein determining the hardware efficiency factor includes determining the predictable capacity consumption rate.

3. The method of claim 1, wherein determining the hardware efficiency factor includes determining a predictable price decrease of the asset.

4. The method of claim 1, wherein determining the hardware efficiency factor includes plotting the hardware efficiency factor over a range of utilization values.

5. The method of claim 1, wherein determining the touch efficiency factor includes determining the predictable capacity consumption rate.

6. The method of claim 1, wherein determining the touch efficiency factor includes determining a predictable price decrease of the asset.

7. The method of claim 1, wherein determining the touch efficiency factor includes plotting the hardware efficiency factor over a range of utilization values.

8. The method of claim 1, wherein determining the touch efficiency factor includes determining the touch efficiency factor based on the following function:

$$E_T = 1 + \frac{L}{\ln r}$$

where, $E_T$ is the touch efficiency factor, r is the utilization of the asset and L is the natural log of a constant G, where G is equal to the growth rate of the asset minus the rate of price decrease of the asset.

9. The method of claim 1, wherein determining the optimal utilization level includes determining a maximum value of the sum of the hardware efficiency factor and the touch efficiency factor over a range of utilization values.

10. The method of claim 1, wherein determining the optimal utilization level includes determining the optimal utilization by finding a maximum value of the following function:

$$E_S = E_H + E_T$$

where $$E_H = (1 + G)\frac{r}{(1 + Gr)}$$

where, $E_H$ is the hardware efficiency factor, r is the utilization of the asset and G is a constant equal to the growth rate of the asset minus the rate of price decrease of the asset, and where $$E_T = 1 + \frac{L}{\ln r}$$

where, $E_T$ is the touch efficiency factor, r is the utilization of the asset and L is the natural log of a constant G, where G is equal to the growth rate of the asset minus the rate of price decrease of the asset.

11. The method of claim 1, further comprising displaying the hardware efficiency factor and the touch efficiency factor over a range of utilization levels.

12. The method of claim 1, further comprising displaying a sum of the hardware efficiency factor and the touch efficiency factor over a range of utilization levels.

13. The method of claim 1, further comprising determining an asset purchasing decision based at least in part on the optimal utilization level.

14. The method of claim 1, further comprising determining an asset-related staffing decision based at least in part on the optimal utilization level.

15. A computer-readable storage medium comprising instructions thereon that, when executed by at least one processor, cause the at least one processor to, determine a hardware efficiency factor for an asset having a fixed capacity and a predictable capacity consumption rate, and wherein determining the hardware efficiency factor comprises determining the hardware efficiency factor based on the following function:

$$E_H = (1 + G)\frac{r}{(1 + Gr)}$$

where, $E_H$ is the hardware efficiency factor, r is the utilization of the asset and G is a constant equal to the growth rate of the asset minus the rate of price decrease of the asset;

determine a touch efficiency factor for the asset, the touch efficiency factor representing a measurement of frequency of touch of the asset, where touch represents a disruption of the asset occurring when the asset reaches the fixed capacity, and where the disruption pursuant providing additional capacity; and determine an optimal utilization level based on both the hardware efficiency factor and the touch efficiency factor, wherein the computer-readable medium is a computer-readable storage medium.

16. The computer-readable storage medium of claim 15, wherein the computer-readable storage medium comprises at least one of a disk and a device.

17. A system comprising at least one computing device, wherein the computing device comprises:

a microprocessor; and an operatively associated computer-readable storage medium, wherein the computer-readable storage medium comprises instructions thereon that, when executed by the microprocessor, cause the microprocessor to:

determine a hardware efficiency factor for an asset having a fixed capacity and a predictable capacity consumption rate, wherein determining the hardware efficiency factor comprises determining the hardware efficiency factor based on the following function:

$$E_H = (1 + G)\frac{r}{(1 + Gr)}$$

where, $E_H$ is the hardware efficiency factor, r is the utilization of the asset and G is a constant equal to the growth rate of the asset minus the rate of price decrease of the asset;

determine a touch efficiency factor for the asset, the touch efficiency factor representing a measurement of frequency of touch of the asset, where touch represents a disruption of the asset occurring when the asset reaches the fixed capacity, and where the disruption is pursuant to providing additional capacity; and determine an optimal utilization level based on both the hardware efficiency factor and the touch efficiency factor.

18. A method, implemented at least in part by a computing device, the method comprising:
   determining, by the computing device, a hardware efficiency factor for an asset having a fixed capacity and a predictable capacity consumption rate, wherein the computing device comprises at least one processor and an operatively associated computer-readable storage medium;
   determining, by the computing device, a touch efficiency factor for the asset, the touch efficiency factor representing a measurement of frequency of touch of the asset, where touch represents a disruption of the asset occurring when the asset reaches the fixed capacity, wherein the disruption is pursuant to providing additional capacity; and wherein determining the touch efficiency factor comprises determining the touch efficiency factor based on the following function:

$$E_T = 1 + \frac{L}{\ln r}$$

where, $E_T$ is the touch efficiency factor, r is the utilization of the asset and L is the natural log of a constant G, where G is equal to the growth rate of the asset minus the rate of price decrease of the asset; and
   determining, by the computing device, an optimal utilization level based on both the hardware efficiency factor and the touch efficiency factor.

19. A system comprising at least one computing device, wherein the computing device comprises:
   a microprocessor; and
   an operatively associated computer-readable storage medium, wherein the computer-readable storage medium comprises instructions thereon that, when executed by the microprocessor, cause the microprocessor to:
   determine, a hardware efficiency factor for an asset having a fixed capacity and a predictable capacity consumption rate;
   wherein the computing device comprises at least one processor and an operatively associated computer-readable storage medium;
   determine a touch efficiency factor for the asset, the touch efficiency factor representing a measurement of frequency of touch of the asset, where touch represents a disruption of the asset occurring when the asset reaches the fixed capacity, wherein the disruption is pursuant to providing additional capacity; and wherein determining the touch efficiency factor comprises determining the touch efficiency factor based on the following function:

$$E_T = 1 + \frac{L}{\ln r}$$

where, $E_T$ is the touch efficiency factor, r is the utilization of the asset and L is the natural log of a constant G, where G is equal to the growth rate of the asset minus the rate of price decrease of the asset; and
   determining, by the computing device, an optimal utilization level based on both the hardware efficiency factor and the touch efficiency factor.

* * * * *